UNITED STATES PATENT OFFICE.

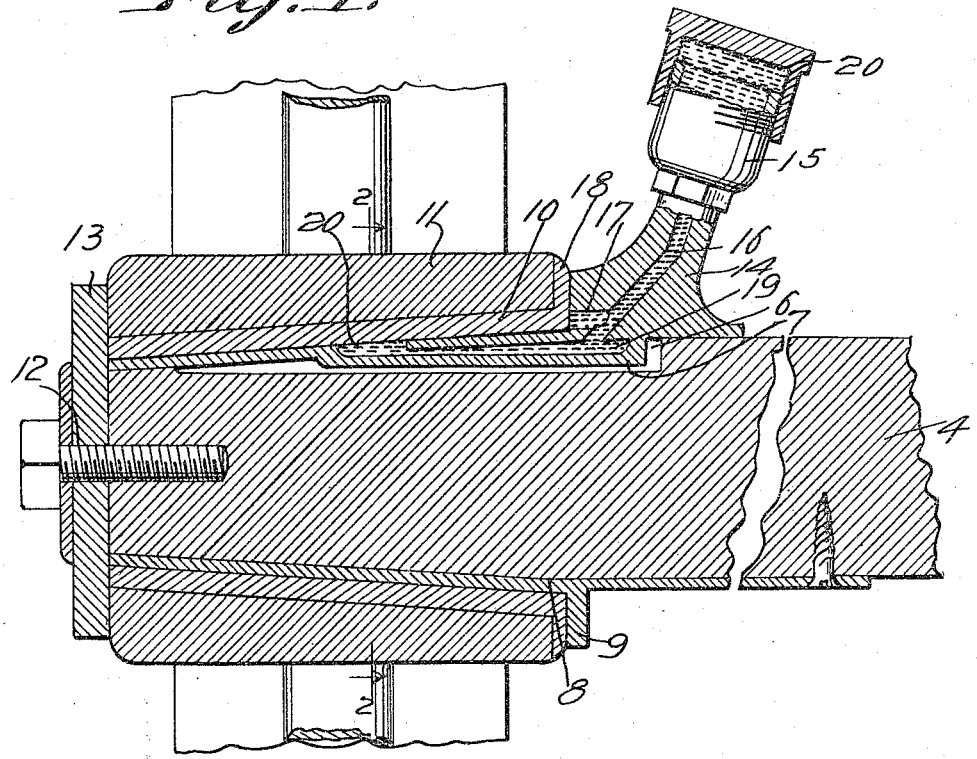
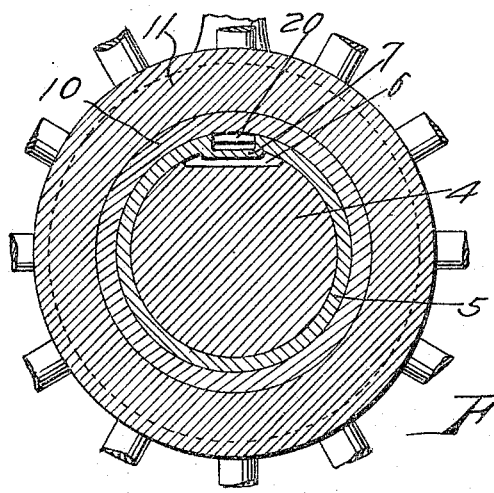
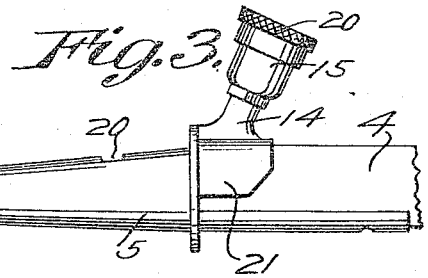

FRANK PETERSON, OF SPOKANE, WASHINGTON.

GREASE-CUP.

1,189,619.  Specification of Letters Patent.  Patented July 4, 1916.

Application filed March 25, 1916. Serial No. 86,706.

*To all whom it may concern:*

Be it known that I, FRANK PETERSON, a citizen of the United States of America, and resident of Spokane, in the county of Spokane and State of Washington, have invented certain new and useful Improvements in Grease-Cups, of which the following is a specification.

This invention relates to vehicle wheels and particularly to means for lubricating the said wheels.

An object of this invention is to provide a combined grease cup and skein for an axle of a vehicle wheel, the said invention having for its object, the provision of novel means whereby lubricant may be supplied to points where it can be distributed for lubricating the contacting portions of the skein and the boxes of vehicle wheels, the said device being readily applied to or removed from an axle and the said skein and lubricating device being self-contained or integral, preferably so that the parts are minimized and the cost of production as compared with other devices is reduced.

A still further object of this invention is to provide a force-feeding device for the lubricant so that it may be pressed into the joints between the contacting parts of the skein and boxing.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification wherein like characters denote corresponding parts in the several views and in which—

Figure 1 illustrates a sectional view of a vehicle axle and skein with a hub applied thereto; Fig. 2 illustrates a sectional view on a line corresponding with the line 2—2 of Fig. 1; Fig. 3 illustrates a view in elevation of an axle and skein on a reduced scale.

In these drawings 4 denotes an axle of a vehicle which may be of any ordinary construction, the ends which receive the spindle 5 being recessed or cut away as at 6 to form a clearance for accommodating an enlarged portion 7 of the skein 8, the said skein having a flange 9 which forms a shoulder for the box 10 of the hub 11. The means here shown for securing the wheel on the skein includes the screw 12 threaded in the end of the axle and bearing against a plate 13 which plate engages the end of the hub, but these details of construction for holding the hub on the skein show one of many types which may be employed to accomplish this result and I, therefore, do not wish to be limited to the construction in this respect here shown. The skein 8 has a stem 14 which terminates in a grease cup 15, the said stem having a channel 16 therein communicating with the grease cup and leading to a channel 17 which opens to the joint between the flange 9 and the flange 18 of the box 10 to insure lubrication of the contacting surfaces of the flange 9 and the flange 18. The duct or channel 16 furthermore communicates with a duct or passage 19 which extends longitudinally of the enlarged portion of the skein and this last mentioned duct or passage has an opening 20 at the outer surface of the skein so that when lubricant is forced through the ducts or channels, it finds exits between the boxing and skein and between the flanges of the boxing and skein as heretofore indicated, thus providing an efficient lubrication of the wearing parts of the vehicle hub or box and the skein on which it rotates.

The cap 21 of the grease cup is threaded on it and when it is turned down on the grease cup, it expels the grease therein so that it finds its way through the channels to the surfaces to be lubricated. The stem 14 is formed as a part of a flange 22 which overlies a portion of the axle as shown in Fig. 3 of the drawing and the structure is thus made sufficiently strong to withstand the usual wear.

I claim—

In a vehicle axle, a skein having an internally extending enlargement, said axle being cut away to produce a clearance for the reception of the enlarged portion, said skein having a stem terminating in a grease cup, said stem having a channel therein, said enlargement of the skein having a channel with which the channel of the stem communicates, a flange on the skein through which a channel extends, said channel being in communication with the channel of the stem and the said skein having an opening forming a terminus of the channel in its enlarged portion.

In testimony whereof I affix my signature.

FRANK PETERSON.

Witness:
BESS KLINESMITH.